US 6,633,292 B2

United States Patent
Nakatsuji et al.

(10) Patent No.: US 6,633,292 B2
(45) Date of Patent: Oct. 14, 2003

(54) RECORDING DEVICE AND RECORDING METHOD

(75) Inventors: Masahiro Nakatsuji, Nagano (JP); Sunao Murata, Nagano (JP); Michitoshi Ishihara, Nagano (JP); Akira Suzuji, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/021,274

(22) Filed: Feb. 10, 1998

(65) Prior Publication Data

US 2001/0043214 A1 Nov. 22, 2001

(30) Foreign Application Priority Data

Feb. 10, 1997 (JP) .............................. 9-026734
Nov. 21, 1997 (JP) .............................. 9-321092

(51) Int. Cl.⁷ ................................. B41J 5/00
(52) U.S. Cl. ...................... 345/467; 345/468; 345/440; 345/441; 235/462.01
(58) Field of Search ................. 345/467, 471, 345/440, 441, 468; 400/103, 83; D14/420, 453; 101/401.6; 235/462.01

(56) References Cited

U.S. PATENT DOCUMENTS

| 4,469,455 A | * | 9/1984 | Makita ........................ 400/171 |
| 4,745,561 A | * | 5/1988 | Hirosawa et al. ............ 364/523 |
| 5,227,617 A | | 7/1993 | Christopher et al. |
| 5,257,351 A | * | 10/1993 | Leonard et al. .............. 395/150 |
| 5,298,731 A | * | 3/1994 | Ett ........................ 235/462.02 |
| 5,313,564 A | * | 5/1994 | Kafri et al. .................. 395/101 |
| 5,496,117 A | * | 3/1996 | Sawada et al. ................ 400/61 |
| 5,496,119 A | * | 3/1996 | Kawakami et al. ........... 400/70 |
| 5,566,277 A | * | 10/1996 | Hideshima et al. ......... 358/1.16 |
| 5,583,970 A | | 12/1996 | Strobel |
| 5,748,484 A | * | 5/1998 | Cannon et al. ........ 364/479.03 |
| 5,857,789 A | * | 1/1999 | Day et al. ................. 400/615.2 |
| 5,893,124 A | * | 4/1999 | Ogaki et al. ................. 707/507 |
| 5,967,675 A | * | 10/1999 | Hastings et al. .............. 400/61 |
| 5,984,545 A | * | 11/1999 | Watanabe et al. ............. 400/61 |
| 6,012,638 A | * | 1/2000 | Ackley et al. ......... 235/462.01 |
| 6,043,826 A | * | 3/2000 | Manning ..................... 345/467 |
| 6,047,891 A | * | 4/2000 | Yamada ................. 235/462.05 |
| 6,175,372 B1 | * | 1/2001 | Ballard et al. .............. 345/470 |
| 6,323,864 B1 | * | 11/2001 | Kaul et al. .................. 345/467 |

FOREIGN PATENT DOCUMENTS

| JP | 5-342384 A | 12/1993 |
| JP | 6-234248 A | 8/1994 |
| JP | 7-195752 | 8/1995 |
| JP | 8-63537 A | 3/1996 |
| JP | 8-185287 A | 7/1996 |
| JP | 9-001867 A | 1/1997 |

* cited by examiner

Primary Examiner—Michael Razavi
Assistant Examiner—Daniel J Chung
(74) Attorney, Agent, or Firm—Sughrue Mion, PLLC

(57) ABSTRACT

A general-purpose system for enabling the user to easily enter characters whose contents are hard to understand at a glance, such as bar codes, by using a general-purpose application program such as a wordprocessor is provided. For this purpose, a printer driver comprising a font file storing a display font and a bar code record font corresponding to the display font and a conversion function of converting display font codes into record font codes is provided. When a bar code is entered in an application program, a legible display font corresponding to the bar code can be used. On the other hand, when the bar code is printed, the printer driver compatible with a given printer converts the display font into a bar code record font and supplies the bar code record font. Thus, a high-accuracy bar code is printed in accordance with the standard.

16 Claims, 11 Drawing Sheets

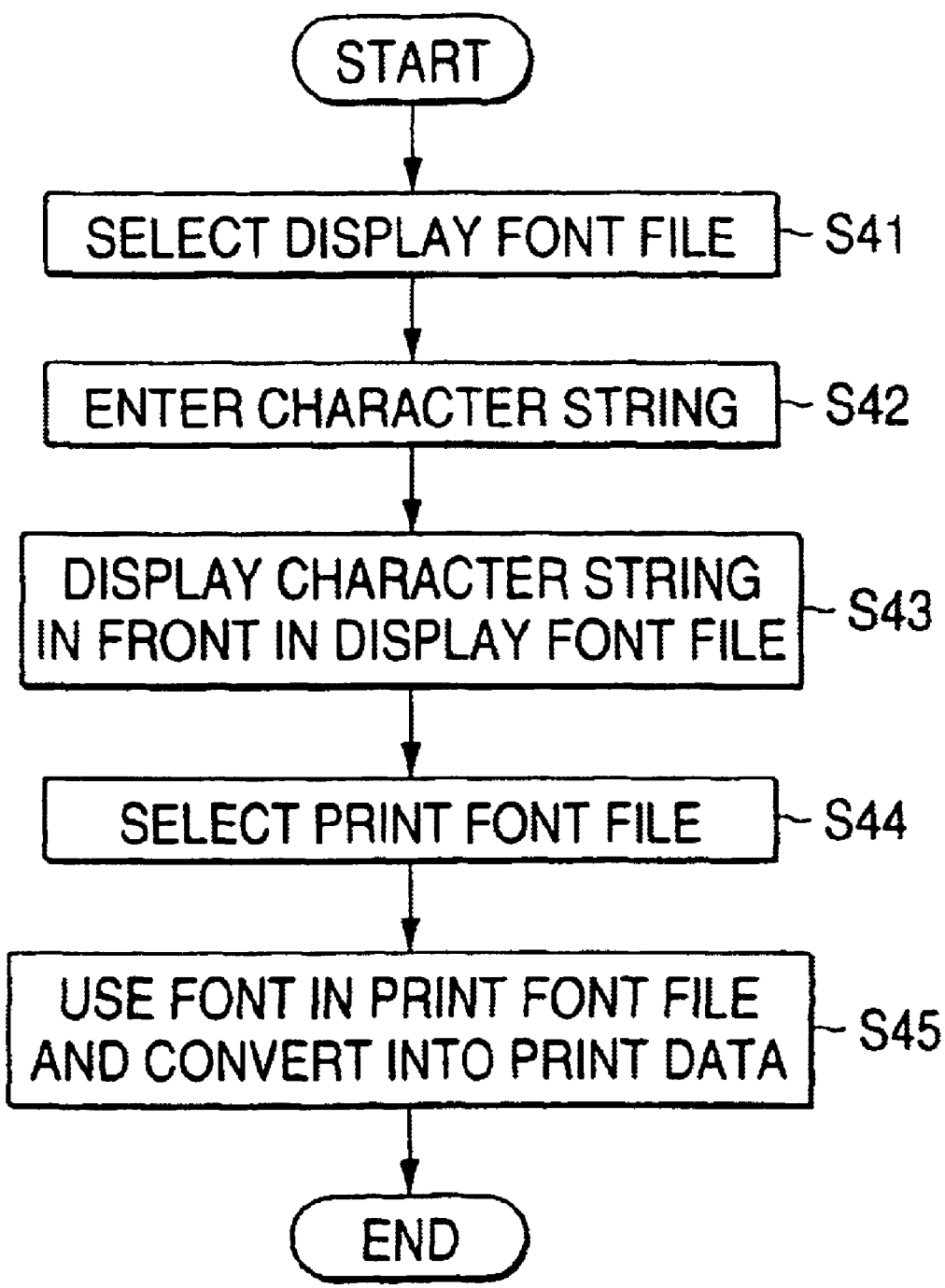

RECORDING DEVICE AND RECORDING METHOD

BACKGROUND OF INVENTION

This invention relates to a recording device and a recording method capable of recording on print paper in a type font different from the font displayed on a display.

FIG. 12 shows a bar code printing system using a system wherein a printer 3 is connected directly or via a network, etc., to a host computer (simply, host) 1 such as a personal computer or a workstation. Installed in the host 1 are an application program 5 such as a wordprocessor that can be used to enter character codes and a printer driver 7 for converting a document entered by using the application program 5 into printable data and transmitting the data to the printer 3. To use the application program 5 to print a bar code, first an input function 11 of the application program 5 is used to enter a character code set specifying the bar code font to be used for printing and bar code is displayed on a display. Next, a format setting function 13 of the application program 5 is used to specify the print format of spacing, size, etc., of the bar code font entered in code, then the printer driver 7 is called for printing.

The printer driver 7 uses a print data preparation function 15 to prepare print data for printing the bar code font displayed on the display in the print format based on the character code set entered with the application program 5 and the print format of print spacing, size, etc. Next, the prepared print data is transferred to the printer 3 by an output function 17. The printer 3, which contains bar code fonts, for example, in the form of outline font, selects a font according to the character code contained in the print data, and prints in the specified print scheme.

However, in such a system, the entry work is burdensome and an entry error easily occurs. That is, the user needs to enter the character code of the bar code font used for printing; if the user attempts to print a bar code meaning a character, a character string, or the like, he or she must enter the character code (simply, code) specifying the bar code font corresponding to the character or the character string rather than the character or the character string. Therefore, the user needs to previously know the code of the bar code font or examine it whenever it is entered. If the entered code or the bar code font corresponding to the entered code is displayed on the display of an input monitor, it is difficult to determine whether or not the displayed code or bar code font is correct. Thus, if a bar code as the user does not intend is entered, it is hard to find the bar code erroneous.

Such a situation occurs not only in printing a bar code, but also in using a font different from the usually used character font, such as historiated initials; it is necessary to look up the character code indicating the font and enter it. Further, although a print font such as deformed historiated initials is displayed on the monitor, it may be illegible for a while, in which case if the user enters a character as he or she does not intend by mistake, the user is hard to find that the character is entered erroneously.

If an application program developed so as to enable the user to enter special characters is used, some of the problems may be solved. However, a general-purpose program that can be used on a familiar wordprocessor, etc., is not available; application programs specialized for printing bar codes, etc., are only available and a general-purpose system that can also be used with other fonts is not developed.

As shown in FIG. 13, a dedicated application program can also be used to record characters in a font different from a display font. The application program requires the following steps: First, at step S41, a display font file is selected, then a character string is entered at step S42 and is displayed at step S43 and further a print font file is selected at step S44, then at step S45, the selected print font file is used to convert the data corresponding to the display font into print data and the print data is output. Since the display and print font files need to be specified separately, time and effort are spent. The user often mistakes the display font file for the print font file or selects a display or print font file as he or she does not intend by mistake.

The dedicated application program passes print data put into bit map image to the printer driver. Thus, the actually printed form may vary from one printer to another. Therefore, if a bar code is printed with such an application, a delicate difference appears on the printed bar code form for each printer and resultantly the bar code may be unable to be read by a bar-code reader. Thus, it is difficult to guarantee high bar code accuracy.

SUMMARY OF INVENTION

It is therefore an object of the invention to provide a recording device and a recording method for enabling the user to easily enter a special font of bar codes, etc., that cannot be entered formerly unless a dedicated application program is used or character code is directly entered and being capable of outputting on recording paper, etc. Particularly, it is an object of the invention to provide a recording device and a recording method for enabling the user to correctly enter a font hard to determine the entry contents from the font itself, such as bar codes or historiated initials, and being capable of recording data hard to determine although display and record font files are not provided separately. It is another object of the invention to provide a recording device and a recording method for enabling functions to be used versatilely by a wordprocessor program, etc., and being capable of outputting standardized format information such as bar codes with good accuracy whatever the printer type may be and a recording medium for recording a font file required when the recording device and the recording method are used.

In the invention, a font conversion function or a font conversion process for converting a display font in record data into a record font corresponding to and differing from the display font and outputting the record font is provided in a recording device or a recording method for processing record data supplied from a general-purpose application program of a wordprocessor, etc., of a peripheral machine such as a printer or a printer driver installed in an information processing system such a personal computer corresponding to the peripheral machine.

The function of converting a display font into a record font is set in the recording device or the recording method for processing the supplied record data, whereby the conversion function can be used with general-purpose software such as a wordprocessor. To realize such a conversion function in the recording device or the recording method corresponding to each peripheral machine such as a printer outputting a record font, processing matching the peripheral machine can be performed and standardized format information such as bar codes can be output with good accuracy whatever the printer type may be. Further, when entering, the user can use a legible display font with a general-purpose application program and thus can enter a special record font easily and correctly.

Such a recording device or recording method of the invention can comprise a conversion rule storage section for storing a conversion rule between a display font and a record font, and a data conversion section or a data conversion process for converting a character string entered in the display font into record data containing the record font based on the conversion rule and outputting the record data.

If the recording device outputs a bar code as the record font, a printer driver comprising a conversion rule recording section for storing a conversion rule between character and bar code font character codes complying with a predetermined bar code standard for supplied character string record data and a data conversion section for receiving an entered character string from an application program, converting the character string into a character code set indicating a bar code font based on the conversion rule, and outputting to a given printer can be supplied. Alternatively, a printer comprising a function of printing a bar code corresponding to a character string of record data supplied in response to a character code set resulting from code conversion in addition to the conversion rule recording section and the data conversion section can be supplied to a character string of record data supplied from an information processing system such as a personal computer. To use the recording device or recording method of the invention, the printer driver or the printer rather than the application generates a bit map image of a bar code, thus the characteristics of the printer used at the time can be considered. Therefore, high-accuracy bar code printing can be guaranteed.

The conversion rule storage section stores a plurality of conversion standards, for example, a plurality of conversion rules complying with a plurality of bar code standards and one conversion rule complying with the bar code standard selected by the user in an application program can be selected from among the conversion rules. Display fonts corresponding to the conversion rules are provided and the user-selected bar code standard can be determined by the recording device based on the display font contained in the supplied record data. In the data conversion section or the data conversion process, the entered character string in the record data can be converted into a character code set indicating the record font of bar codes, etc., based on the selected conversion rule. Therefore, the user need not consider the bar code font difference caused by bar code standards and needs only to enter data in the display font corresponding to a desired bar code standard.

Further, if format information when a record font is recorded, for example, a plurality of format information pieces complying with bar code standards are previously stored, one formation information pieces complying with the user-selected conversion standard is selected from among the format information pieces and the data conversion section can reflect the format information on the record data and output the result. Therefore, the user need not consider the format (for example, the limit to available characters, the limit to the number of characters, bar code printing spacing, size, etc.,) difference caused by the bar code standards.

A recording device and a recording method provided with display fonts (display font data) displayed on a monitor display, etc., and record fonts (record font data) actually recorded on recording paper, etc., in a single file to convert a display font into a print font different from the display font and being capable of converting a legible display font into a record font such as a bar code font different from the display font and outputting the record font can also be adopted. That is, the recording device of the invention has a data conversion section capable of converting a display font into a record font different from the display font, provided in the font file comprising the display font and outputting the record font as a font conversion function. The recording method of the invention has a data conversion step capable of converting a display font into a record font different from the display font, provided in the font file comprising the display font and outputting the record font as a font conversion step.

The recording device and the recording method having the functions can be provided as a program such as a printer driver that can be executed by a host such a personal computer or a part of a control program of a printer. The recording device and the recording method comprising the data conversion function of converting a display font into a record font different from the display font, provided in the font file comprising the display font and outputting the record font can be provided by recording a program having the instruction for executing the process on a recording medium that can be read by a computer. Of course, the program can also be distributed via a computer network such as the internet.

In the recording device and the recording method of the invention, a font file having a first font group comprising a plurality of fonts and a second font group comprising fonts corresponding to at least some fonts in the first font group and differing from the fonts in the first font group can be used. The first font group can be used as display fonts and the second font group can be used as record fonts. Of course, a third font group comprising fonts different from the fonts in the first and second font groups can also be placed in the same font file. Such a font file can also be recorded on a recording medium that can be read by a computer or be distributed via a computer network.

To use the recording device and the recording method of the invention, the entry contents can be displayed in a display font that can be understood by the user and when the entry contents are recorded (printed), the display font can be converted into a record font for output. That is, a recording system can be constructed which selects one font file, displays in a display font contained in the font file, can print in a record font contained in the font file having the display font. Therefore, without changing display and record font files, the entry contents are displayed in a legible font and can be printed in a desired record font. Thus, a burdensome step for again selecting a font file is eliminated and further selecting a font file by mistake can be prevented Further, in the recording device and the recording method of the invention, data can be entered in a legible display font and special character code need not be specified, so that entry becomes very simple. Since the entry contents can be displayed in a display font, an error of the entry contents can be checked easily.

Further, the display and record fonts are stored in a single font file, whereby the font file containing the display font corresponding to the print font need not be specified and mistakes at the printing time are also lessened. Therefore, data hard to read, such as bar codes, can also be entered reliably.

If the display and record fonts are stored in a single font file and a display font is converted into a record font for output, special characters can be handled by using an application program comprising input and display functions, such as a wordprocessor where normally only one font file can be specified. Therefore, a versatile program independent of a wordprocessor or any other application can be provided. Further, in an application program such as a wordprocessor for specifying a font file, desired special characters of bar codes, historiated initials, etc., can be changed only using the general-purpose functions provided.

The recording device of the invention can be realized as a printer driver built in the operating system for use as described above and can convert into a record font and output the record font when data entered through a word-processor is output to a printer. It can also be realized as a printer or any other peripheral machine for receiving record data from a personal computer, etc., and printing the record data or a control program of the printer or peripheral machine. To use a font file, the recording device of the invention can also be realized as a printing system or a peripheral machine such as a printer comprising a recording medium for storing the font file, print means for printing in a record font in the font file, and display means for displaying in a display font in the font file or a control program of the printing system or peripheral machine. The display font input from the host can be converted into a record font and the record font can be output on a recording medium such as print paper.

The current system wherein a font is specified in code (character code) corresponding to the font can adopt the recording device and the recording method having a data conversion section or a data conversion step for converting a first code indicating a display font into a second code indicating a record font different from the display font, provided in the font file comprising the display font and outputting the second code or bit image data in the record font indicated by the second code and can provide the function of converting a display font into a record font and outputting the record font. Further, if a plurality of record fonts are contained in the same font file, the record font can also be changed by making it possible to select the second code corresponding to the first code.

BRIEF DESCRIPTION OF DRAWINGS

FIG. 13 is a flowchart to show an example of using a dedicated application to print font that cannot simply be read.

DETAILED DESCRIPTION OF PREFFERED

[First Embodiment]

Figure 1:
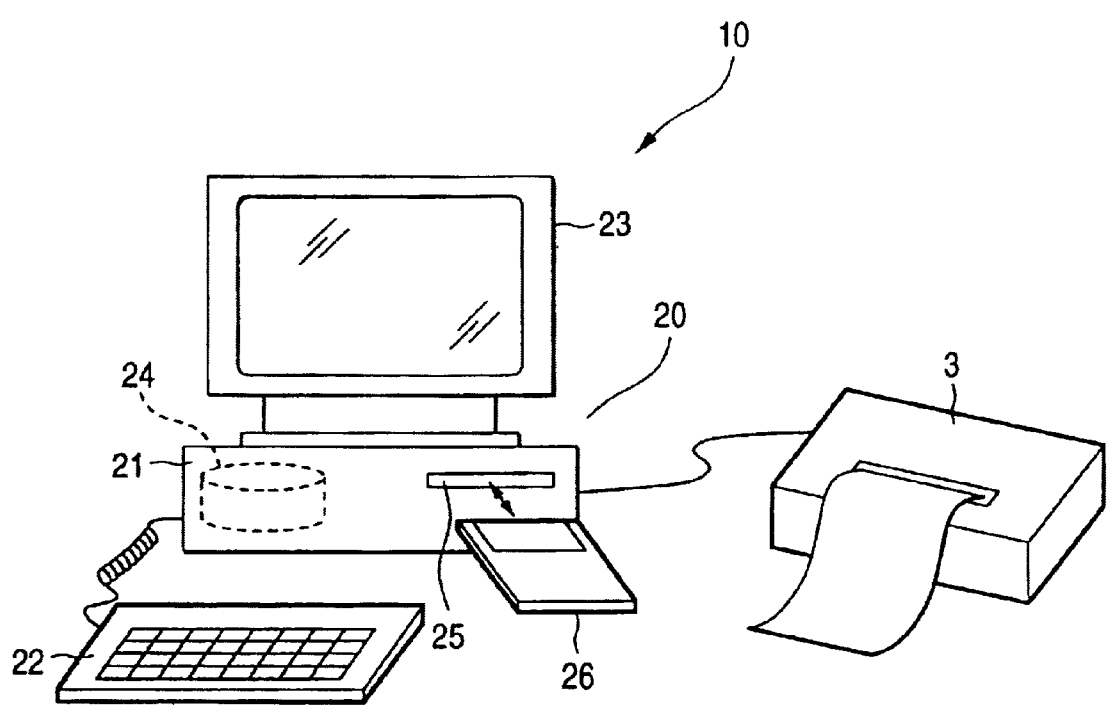
FIG. 1 is an illustration to show the hardware configuration of a printing system according to a first embodiment of the invention;.

Referring now to the accompanying drawings, the invention will be discussed in more detail. FIG. 1 shows an example of a printing system according to the invention. A printing system 10 of a first embodiment of the invention uses a personal computer 20 as a host computer 1 and has a printer 3 connected to the personal computer 20. The personal computer 20 comprises a main unit 21, a keyboard 22 for entering data, and a display 23 capable of displaying entered data, etc.

The main unit 21 comprises a hard disk unit 24 with a fixed recording medium and a CD-ROM unit 25 of a movable recording unit with a portable recording medium into which a CD-ROM 26 of a recording medium can be inserted for use.

Figure 2:
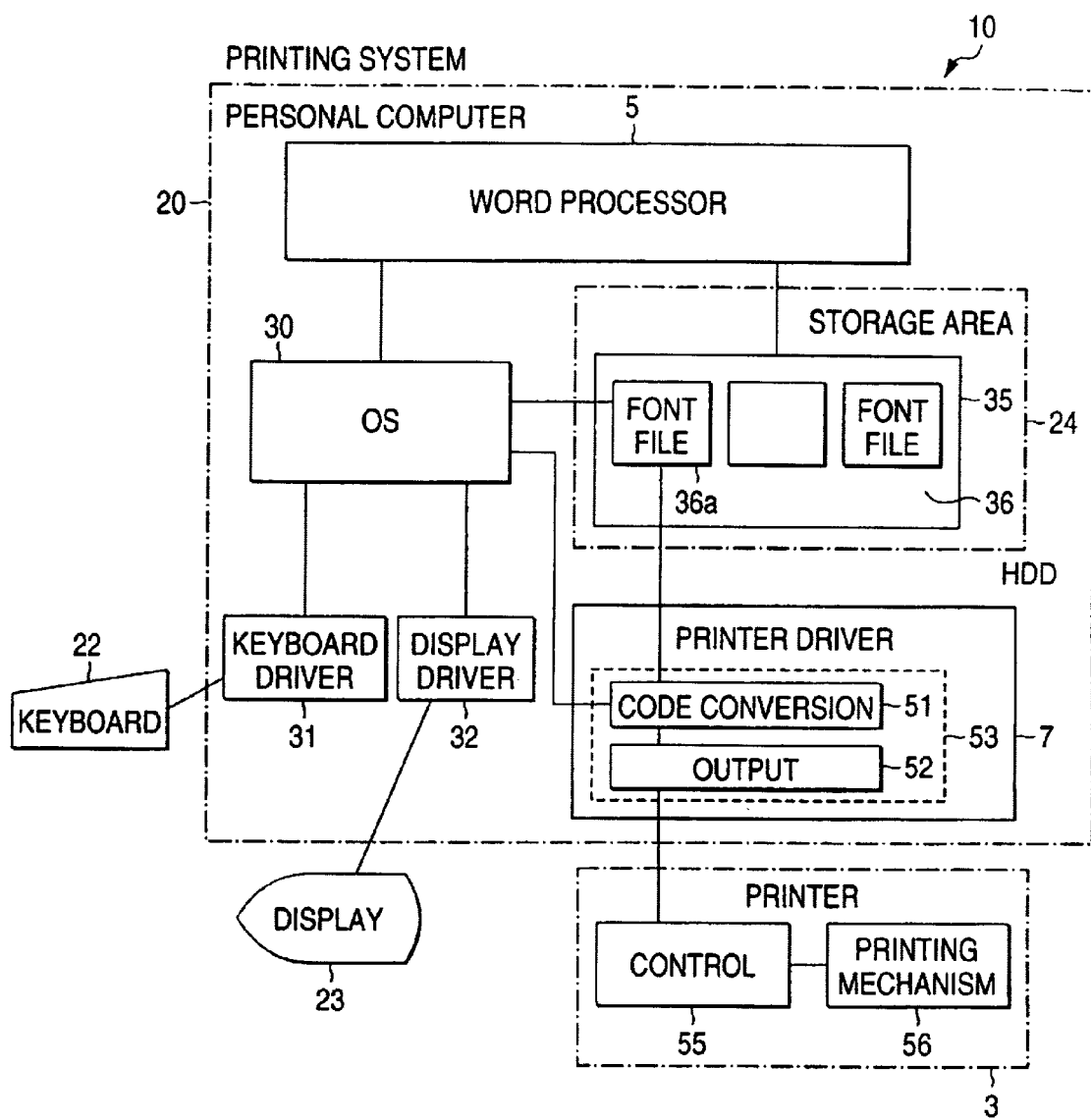
FIG. 2 is a block diagram to show the functions of the printing system shown in FIG. 1.

FIG. 2 is a block diagram to show the functional configuration of the printing system 10. With the personal computer 20, an application program (simply, application) 5 having a wordprocessor function operates on an OS (operating system) 30 for editing a character string entered through the keyboard 22 via a keyboard driver 31 and the edited character string is displayed on the display 23 via a display driver 32. The application 5 enables the user to specify the font to be used by selecting any of font files 36 stored in a storage area 35 set in the hard disk unit 24, etc., and the display driver 32 uses the display font in the selected font file 36a for display.

To print a character string edited by the application 5, record (print) data is supplied to a printer driver 7 and the character string is output via the printer driver 7 to the printer 3 as print data. The printer 3 receives the print data at a control section 55 and records the print data on record paper by a printing mechanism 56. To output data comprising character codes indicating a character string as print data output to the printer 3, outline font contained in the printer 3 is used and the data is expanded into bit image data by the control section 55. The printer driver 7 can also expand character codes into bit image and transmit the data to the printer 3; the data expanded into bit image is sent to the printing mechanism 56 and is printed.

The printer driver 7 has a data conversion section 53 comprising a code conversion function 51 capable of converting character codes indicating a character string received from the application 5 via the OS 30 into character codes (codes) for print (record) font and an output function 52 capable of using the resultant codes to prepare print data and output the print data. Therefore, the printer driver 7 can convert code indicating the display font handled in the application 5 into different code indicating the print font handled in the printer 3 and prepare print data based on the resultant print font codes. In the recent printing system 10, the font used with the application 5 can be changed simply by specifying one of the font files 36 so that various fonts can be easily handled meeting user's wishes. In response to this, the printer 3 may be provided with different font files as many as the number of font files in the personal computer 20, but a large storage capacity becomes necessary. Thus, generally data expanded into bit image using the font file provided in the personal computer 20 by the printer driver 7 is transmitted to the printer 3.

Figure 3:
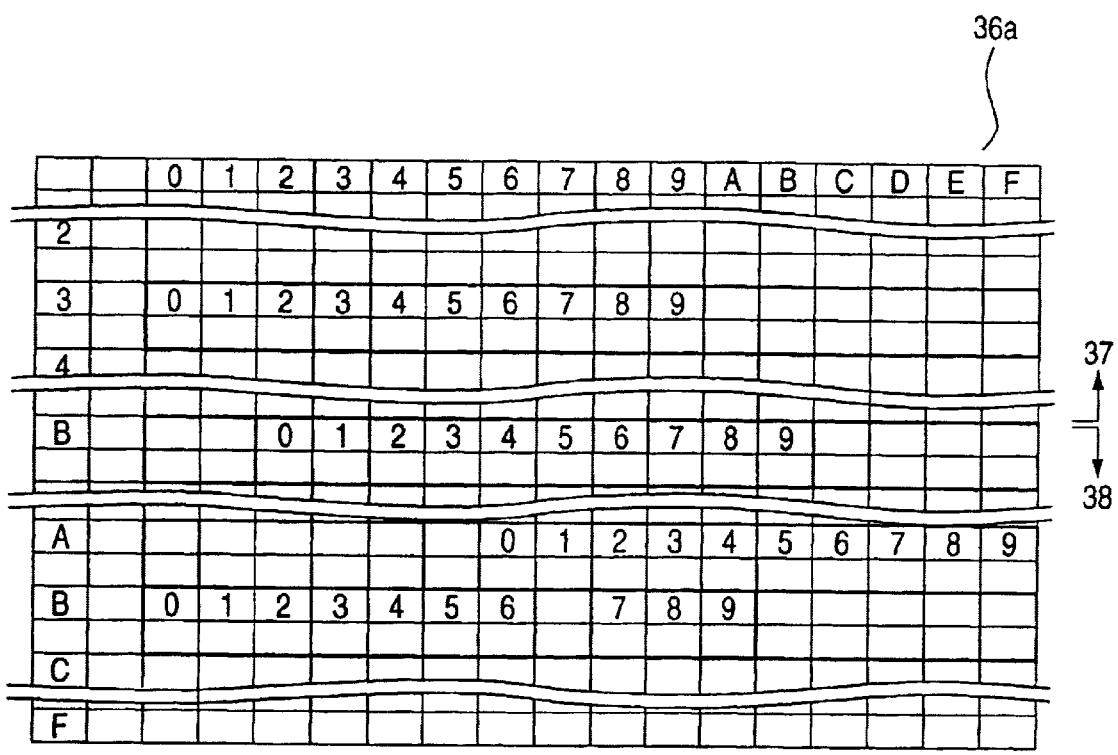
FIG. 3 is a drawing to show an outline of a bar-code font file as an example of a font file in the printing system shown in FIG. 1.

FIG. 3 shows an example of the font file 36 used with the printing system 10. The font file 36a shown in the Fig. is a font file for displaying and printing JAN-standard bar codes. The code area of less than code 80H (H denotes hexadecimal notation) becomes a display area 37 storing display font (font data) and the area of code 80H and later becomes a record area 38 storing print fonts. For example, the display area 37 stores a display font (font data) for displaying digits 0 to 9 in codes 30H to 39H. On the other hand, the record area 38 stores an odd parity bar code record font indicating digits 0 to 9 in codes 82H to 8BH, an even parity, left bar code record font in codes A6H to AFH, and an even parity, right bar code record font in codes B8H to BAH.

Therefore, if the font file 36a is specified for a character string contained in the record data supplied from the upstream application program 5, the printer driver 7 uses the code conversion function 51 of the data conversion section 53 to convert the codes in the display area 37 into the codes in the record area 38 according to a proper conversion rule, prepares print bit image data in the record font in the record area 38, and outputs the data to the printer 3. Thus, the printer 3 records the character string in the record font corresponding to the character string in the display font edited and specified for printing by the application program 5 on print paper and discharges the print paper. Further, to print an odd parity bar code, the code conversion function 51 can convert into the corresponding record font (codes 82H–8BH) and to print an even parity bar code, the code conversion function 51 can convert into the corresponding record font (codes A6H–AFH, B0H–B6H, and B8H–BAH) also containing the position. Therefore, the user can print a JAN-standard bar code simply by selecting the bar code font file 36a in the application 5. Further, to print a bar code in a different standard from the JAN standard, for example, in code 39 standard, a font file for the standard is provided separately, thus a bar code conforming to the standard can be printed simply by specifying the font file. Using the bar code font files, the user can always enter data while monitoring in an easily recognizable font using a display font. Of course, to preview a record image using the function of the printer driver 7 in the application 5, the record image is also displayed on the display 23 with display font converted into record font.

Figure 4:
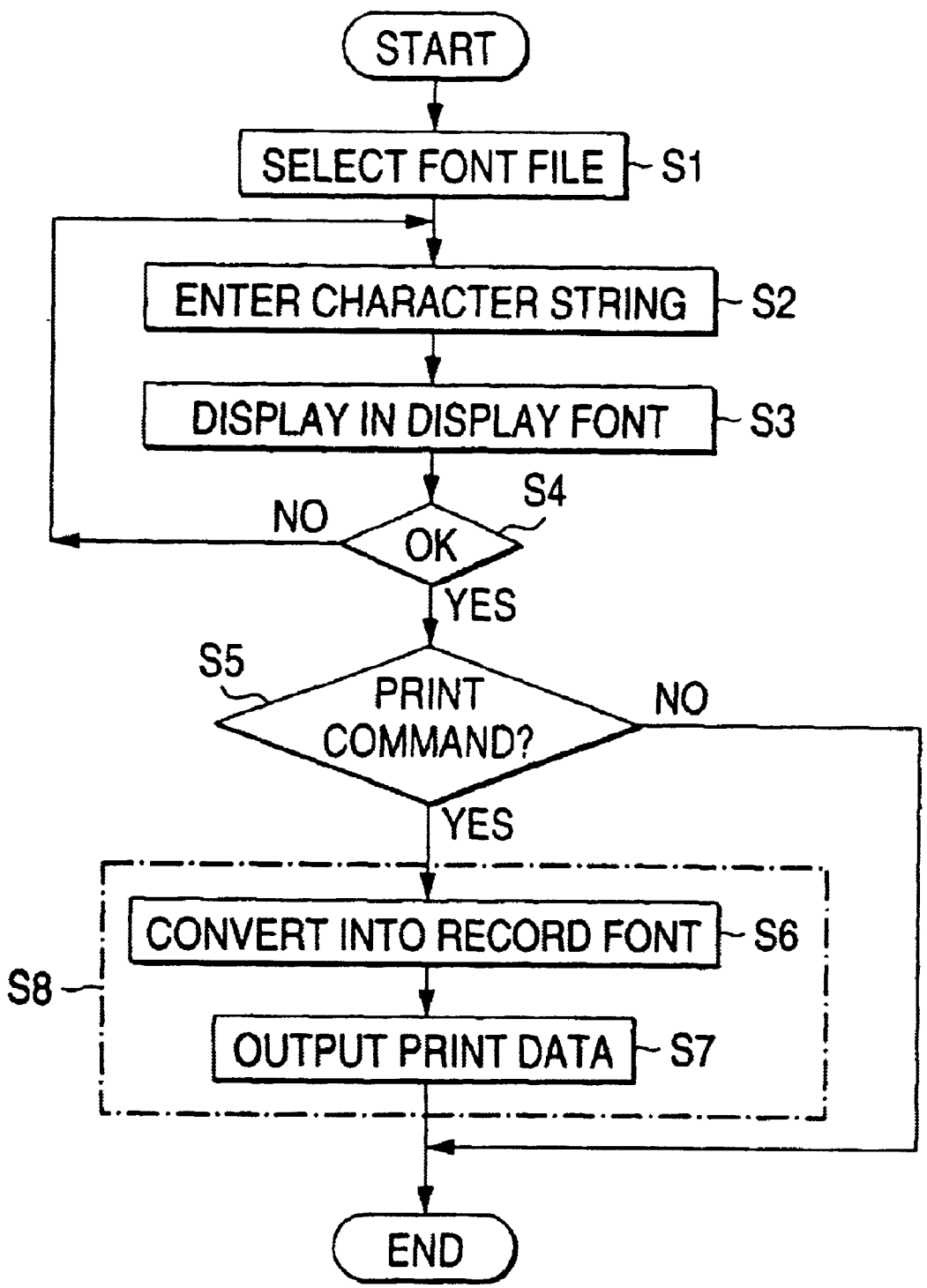
FIG. 4 is a flowchart to show a process example of printing a bar code using the print system shown in FIG. 1.

FIG. 4 is a flowchart to show a process of recording (printing) a bar code using the print system 10. First, at step S1, the font file 36a for the bar code to be printed in the application 5 is specified. Next, at step S2, a character string to be converted into a bar code is entered through the keyboard 22, etc.

Figure 5:
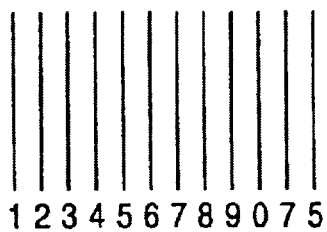
FIGS. 5(a) and 5(b) are an illustration to show display examples when a bar code is entered in the process shown in FIG. 4.
Figure 5:
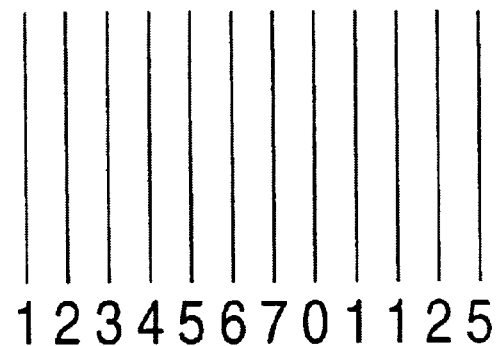

The codes entered through the keyboard 22 are codes indicating digits 0–9. At step S3, the character string entered in the display font (codes 30H–39H) in the font file 36a is displayed on the display 23. If a bar code is entered, it is displayed on the display 23 in the font stored in the display font area 37 of the bar code font file 36, for example, as shown in FIG. 5 (a). In the example, entered digits and a mark (vertical lines) indicating the bar code print area are displayed. Therefore, the entry contents and the bar code occupation area when the bar code is printed can be seen at a glance.

Figure 6:
FIGS. 6(a) and 6(b) are an illustration to show print examples of an entered bar code in the process shown in FIG. 4.
Figure 6:
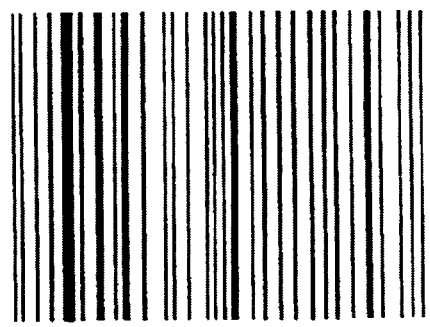

If the user acknowledges the entry contents and the bar code layout in the document with the display font displayed at step S4 and gives a print command at step S5, the data containing the character string indicated by the display font codes is supplied to the printer driver 7 as print data. At step S6, the printer driver 7 converts the display font codes into record font codes provided in the record area 38 of the font file 36a according to a predetermined operation method, a look-up table, a conversion rule, or the like. At step S7, the print data (record data) with the display font converted into the record font is output to the printer 3. Therefore, at step S8, font conversion step, consisting of steps S6 and S7, the printer driver 7 uses one font file 36a to convert the display font in the supplied print data into a different record font (bar code font) and outputs the print data, then the bar code is printed as shown in FIG. 6 (a).

Thus, to use the application 5 to print a bar code, the printing system 10 enables the user to recognize the bar code and see the display font almost similar to the conventional character entry for editing rather than to see the bar code directly for editing. Therefore, the bar code font size is also changed easily; if the user selects reedit at step S4 and enlarges the font size at step S2, the display font is enlarged as shown in FIG. 5 (b) matching the font size at step S3.

If the user gives a print command in this state, the printer driver 7 converts the display font into the record font and outputs print data as described above. Thus, as shown in FIG. 6 (b), the printed bar code size becomes the size in compliance with the edit contents in the application 5.

Further, to print a bar code, the printing system 10 provides font files each storing at least two types of fonts, display and record fonts, and converts the display font into the record font by the printer driver 7. This eliminates the need for specifying a display font file and a record font file separately as in the conventional dedicated application; the user needs only to specify one font file. Therefore, the user need not perform such burdensome work of again specifying another font file or specifying more than one font file and an error such as selecting of a font file by mistake can also be prevented.

Use of the printer driver 7 eliminates the need for adding a special function for printing a bar code to the application 5 and also eliminates the need for adding any function to the OS 30 itself. The bar code font file 36a and the printer driver 7 that can use the font file 36a are simply installed, whereby a general-purpose operating system, a software wordprocessor, and the like can be used to enter and print a bar code as described above. The bar code font file 36a and the printer driver 7 can be recorded on a recording medium such as the CD-ROM 26 for distribution, so that they can be easily installed in the personal computer 20 forming a part of the printing system 10. The bar code font file 36a and the printer driver 7 can also be supplied simply via a computer network such as the internet, so that they can be recorded on a recording medium such as the hard disk 24 for use.

Further, since bit image data prepared in a record font for recording bar codes provided in the font file 36a is sent to the printer 3, accurate bar codes can be printed and a record error or a read error can be prevented almost completely. Further, if the printer 3 is also provided with the bar code font file 36a, the font file in the printer 3 can also be used to expand data into bit image data. In this case, data can be transmitted to the printer 3 with display font codes converted into record font codes by the printer driver 7. The control section 55 of the printer 3 can also be provided with a code conversion function for converting display font codes into record font codes; the resultant codes can be used to output record data put into a bit image from the font file to the printing mechanism 56.

Further, if a system is used wherein the font files 36 comprising the display and record fonts and the printer driver 7 or the printer control section (control program) 55 having the function capable of converting display font codes into record font codes function as an interface between the application program and the print function, not only the bar codes shown above, but also characters, graphics, etc., that cannot be entered formerly unless character codes are directly entered can be entered easily through the keyboard, etc. For example, to enter characters such as complicated alphabetical historiated initials hard to see at a glance, a font file storing a conventional alphabet font displayed on the display as a display font and a historiated initial font as a record font can be used. Entered characters can be converted into historiated initials for output by providing a printer driver comprising a function capable of converting the display font codes in the font file into the corresponding record font codes of alphabetical historiated initials.

If the font file and printer driver are used, an entered character string is displayed on the display in the normal alphabet, thus an entry mistake, etc., can be corrected immediately. On the other hand, when the entered character string is printed, the printer driver automatically converts the alphabet into historiated initials, so that the entered character string is converted into historiated initials and the historiated initials are printed.

Further, the printing system enables the user to enter bar codes using the bar code font file and historiated initials using the historiated initial font file in the same manner simply by changing the font file in the application 5. The application 5 does not require any special function or configuration for entering bar codes, historiated initials, or any other special characters. Therefore, the system using the font files and the driver program or the print program is an extremely versatile system and can be applied to entry fields of not only bar codes and historiated initials, but also various characters.

The record font output destination is not limited to printers. It can also be used in various fields in such a manner that a display font is displayed on a monitor display and a record font into which the display font is converted is displayed on a presentation display.

[Second Embodiment]

Figure 7:
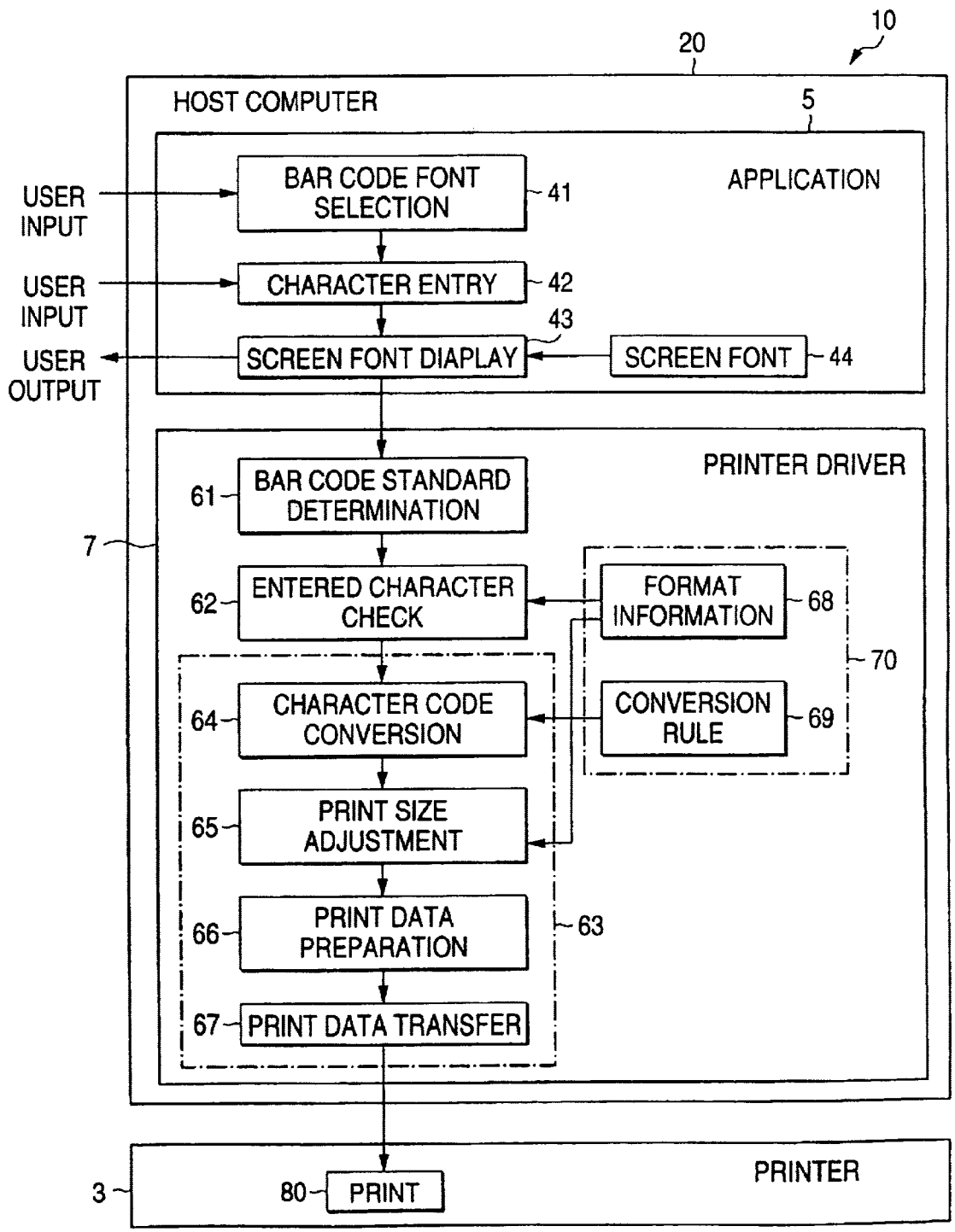
FIG. 7 is a block diagram to show the functional configuration of a bar code printing system of a second embodiment of the invention.

FIG. 7 shows the configuration of another printing system according to the invention that can easily print bar codes like the printing system of the first embodiment. A system 10 of a second embodiment of the invention is also a system comprising a terminal printer 3 connected to a host computer 20 such as a personal computer or a workstation. An application program 5 and a printer driver 7 are installed in the host computer 20.

The application program 5, which is an application program comprising a normal wordprocessor function, has functions of executing a process 41 for prompting the user to select a font used when entering a bar code font in response to a desired bar code standard, a process 42 for prompting the user to enter a character string to be converted into a bar code, and a process 43 for displaying the bar code corresponding to the entered character string on a display screen (not shown). A screen font file 44 storing screen display fonts (display fonts, screen fonts) corresponding to bar codes under various standards is provided for use in the screen display process 43. The screen font file 44 contains a set of screen fonts following various bar code standards. The font selection process 41 enables the user to select a desired font from among various bar code fonts (bar code standards) displayed in a menu format on the display screen. The character entry process 42 enables the user to enter a character string to be printed as a bar code through a keyboard, etc. In the screen display process 43, the screen font of the character string entered by the user in accordance with the user-selected font (corresponding to bar code standard) is read from the screen font file 44 and is displayed on the display screen.

The application 5 may be designed to be dedicated to bar code printing according to the invention. However, considering user's convenience, preferably the application 5 is a general-purpose application such as a wordprocessor or a spreadsheet package, as described above. Such a general-purpose application comprises the function of the character entry process 42 described above as a conventional standard function and the processing function equivalent to the font selection process 41 and the screen display process 42 for normal characters understood by human beings rather than bar codes. Therefore, the application 5 that can be used in the embodiment can be provided simply by adding a small amount of data for containing a bar code font selection menu in a conventional font selection process menu or providing a bar code font selection menu as a separate menu and relating predetermined screen fonts to bar code standards.

Therefore, a general-purpose application can be used to easily print high-accuracy bar codes as described below:

The printer driver 7 comprises a process 61 for determining user-selected bar code standard (bar code font) by a screen font character string contained in print data supplied from the application 5 to the printer driver 7, thereby providing a conversion rule selection section function. The printer driver 7 further includes a process 62 for checking whether or not a user-entered character string complies with the bar code standard format and a data conversion process 63 for converting the user-entered character string into corresponding bar code font character codes and outputting print data. Further, a conversion rule storage section 70 comprising a format information file 68 storing format information of various bar code standards and a conversion rule file 69 storing code conversion rules of various bar code standards is provided as a part of the printer driver 7 or corresponding to each printer driver 7.

The data conversion process 63 has a function of executing a process 64 for converting a print data character string supplied to the printer driver 7 into corresponding bar code font character codes, a process 65 for automatically adjusting the print size, etc., of each bar code font, a process 66 for preparing print data, and a process 67 for transferring the print data to the printer 3.

The format information file 68 in the conversion rule storage section 70 is used in the entered character check process 62 and the print size adjustment process 65 and stores format information of bar code standards, such as information specifying the bar code print format of each standard (print format in broad sense) such as the character types that can be used under the standard, the limit to the number of characters making up a character string, and the print format in the narrow sense like bar code font print spacing and print size.

The conversion rule file 69 is used in the character code conversion process 64 and stores conversion rules of each bar code standard, such as a conversion table for converting various character codes into the corresponding bar code font character codes following the bar code standard and a determination algorithm of an additional bar code (check code) to a bar code to check the bar code corresponding to a character string for validity.

The bar code standard determination process 61 determines the user-selected bar code font on the application 5 based on the screen font (display font) of a supplied character string and specifies one bar code standard corresponding to the bar code font. The character check process 62 checks whether or not the user-entered character string on the application 5 matches the format of the selected bar code standard (for example, whether or not a nonstandardized character is contained, the number of characters is valid, etc.,) by referencing the format information of the selected bar code standard in the format information file. The character code conversion process 64 converts a character code set of the entered character string into a character code set indicating the bar code font corresponding to the selected bar code standard by referencing the conversion rule of the selected-bar code standard in the conversion rule file 69. The conversion process 64 further uses a check code determination algorithm of the selected bar code standard in the conversion rule file 69 to prepare a bar code font character code as a check code and adds the character code to the bar code character code set converted from the entered character codes. The print size adjustment process 65 gets information defining print spacing, print size, etc., of the bar code font corresponding to the entered character string from the format information of the selected bar code standard in the format information file 68.

Based on the character code set indicating the bar code font to be printed, provided by the character code conversion process 64 and the information of the print spacing and print size of the bar code font gotten by the print size adjustment process 65, the print data preparation process 66 prepares print data for the printer to print the bar code font in the spacing and the size. The print data is transferred through the operating system to the printer 3 in a transfer process 67 following the print data preparation process 66. The printer 3 contains bar code fonts in the form of outline font data. Upon reception of the print data via the printer driver 7 from the host computer 20, the printer 3 executes a print process 80 for printing the bar code font specified in the print data in the spacing and size specified in the print data.

Figure 8:
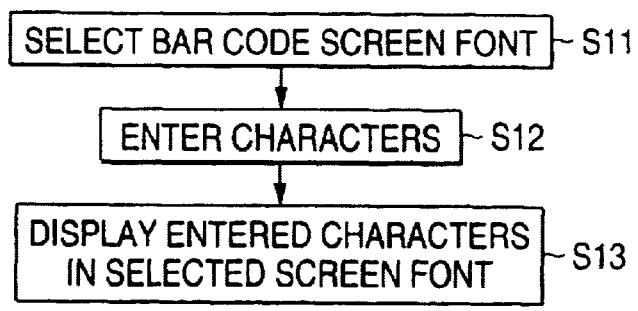
FIG. 8 is a flowchart to show-processing of an application program in FIG. 7.

FIG. 8 shows a processing flow of the application 5. First, at step S11, various bar code screen fonts are displayed in a menu format on the display screen and one screen font is selected in response to the user operating the keyboard, mouse, etc., for the menu. The screen fonts displayed in the menu are in a one-to-one correspondence with the bar code standards and therefore selection of a screen font means selection of the bar code standard corresponding to the selected screen font. Next, at step S12, character entry of the user through the keyboard, etc., is accepted. When a character string is entered, the screen font corresponding to the entered character string is selected out of the selected screen font and is displayed on the display screen at step S13. Seeing the displayed screen font, the user can check the actual bar code pattern corresponding to the entered character string. At the termination of entering the character string, normally the user calls the printer driver 7 to print the bar code corresponding to the character string.

Figure 9:
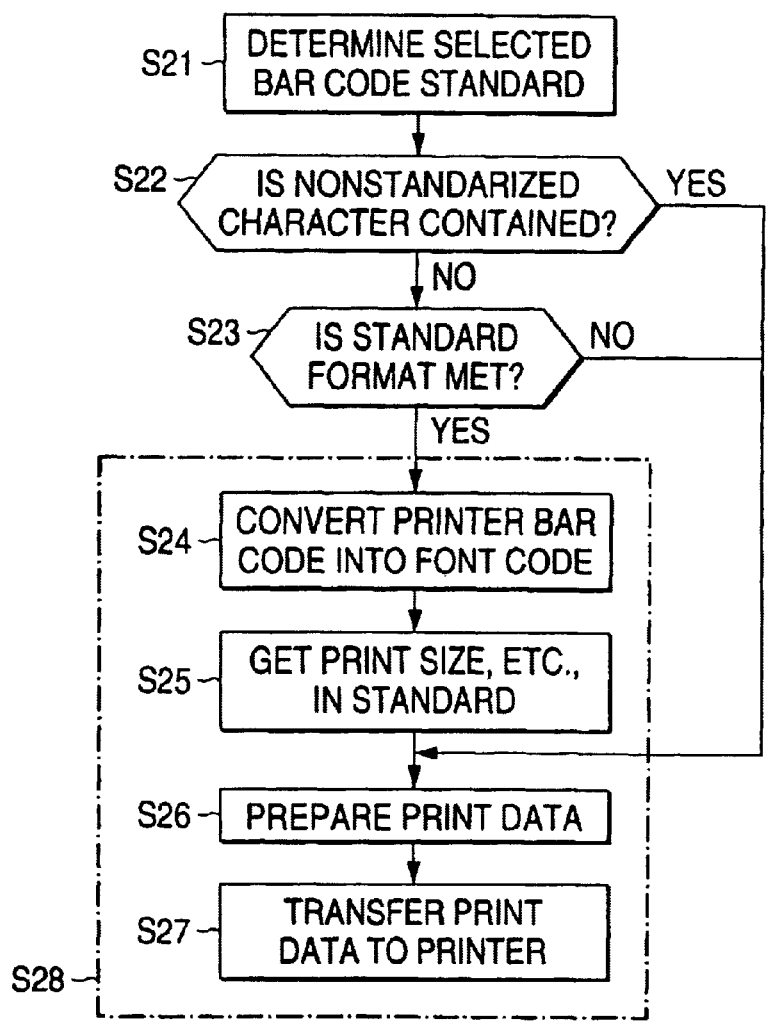
FIG. 9 is a flowchart to show processing of a printer driver in FIG. 7.

FIG. 9 shows a processing flow of the printer driver 7. First, at step S21, based on the screen font selected on the application 5, the bar code standard corresponding to the font, namely, the user-selected bar code standard is determined.

Next, the format information of the selected bar code standard is referenced to check whether or not the entered character string contains any character that cannot be used under the standard at step S22 and check whether or not the entered character string meets the standard format, such as the limit to the number of characters, at step S23. If the entered character string does not contain any nonstandardized character and meets the standard format as the check result, then a data conversion process (S28) consisting of steps S24 to S27 is executed for referencing the conversion rule of the selected bar code standard, converting the character codes of the entered character string supplied from the application program into a character code set indicating the bar code font contained in the printer, and outputting the character code set. First, at step S24, the character codes of the entered character string are converted into a character code set indicating the bar code font contained in the printer corresponding to the standard specified at step S21. At this time, a check code is also determined and is added to the character code set. Next, at step S25, the format information of the selected bar code standard is referenced to get the print spacing and print size of the bar code font corresponding to the entered character string and the check code. Then, the character code set generated at step S24 and the print spacing and print size information gotten at step S25 are used to prepare print data for the printer 3 to print the bar code at step S26 and the print data is transferred to the printer 3 at step S27. Resultantly, the printer 3 prints the correct bar code pattern in the selected standard corresponding to the entered character string.

On the other hand, if the entered character string contains any nonstandardized character or does not meet the standard format as the check result at step S22 or S23, print data for the printer 3 to print the entered character string and the information indicating the selected bar code standard intact is prepared at step S26 and is transferred to the printer 3 at step S27. Resultantly, the entered character string and a character string indicating the selected bar code standard are printed out for the user to later examine the problem.

Thus, in the bar code printing system, the user selects a desired bar code standard on the application 5 and enters a character string to be converted into a bar code in a display screen font, whereby the bar code corresponding to the entered character string complying with the desired standard is printed accurately.

[Third Embodiment]

Figure 10:
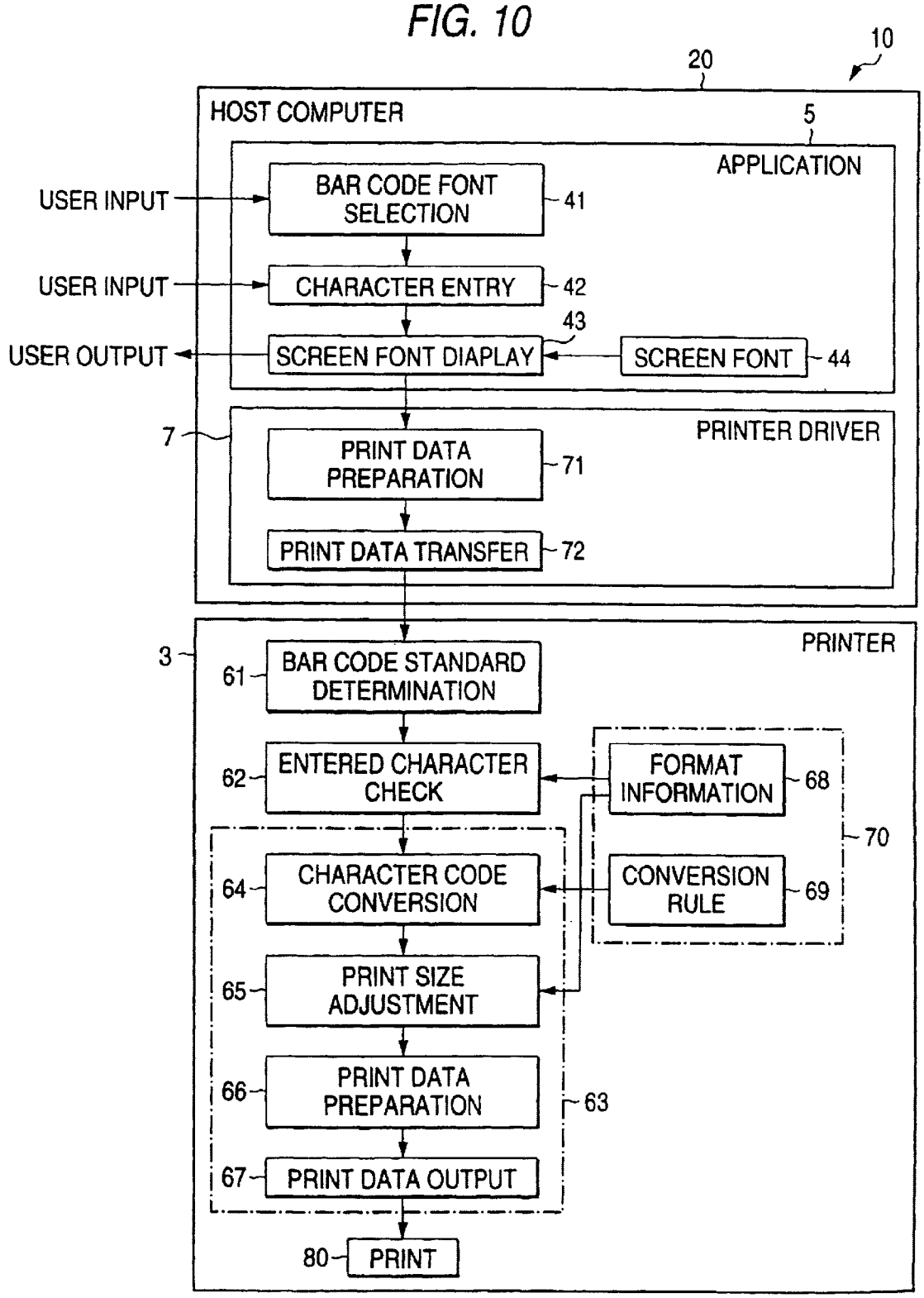
FIG. 10 is a block diagram to show the functional configuration of a bar code printing system of a third embodiment of the invention.

FIG. 10 shows the configuration of a printing system according to a third embodiment of the invention. The printing system provides a printer 3 with a function for executing a bar code standard determination process 61, a character check process 62, and a data conversion process 63 as well as a print process 80. Thus, the printer 3 is also provided with a conversion rule storage section 70 storing a format information file 68 and a conversion rule file 69. The processes 61, 62, and 63 and the conversion rule storage section 70 are basically the same as those of the printing system shown in FIG. 7 and will not be discussed again. Print data prepared in a process 66 after conversion in the printer 3 is supplied to a printing mechanism in the printer 3 for printing.

In the third embodiment, the printer 3 realizes a function of converting screen font data supplied from an application 5 into a bar code, thus a printer driver 7 executes a process 71 for preparing print data in screen font and a process 72 for transferring the print data. Therefore, the print data preparation process 71 of the printer driver 7 prepares print data containing information indicating the screen font (bar code standard) selected on the application 5 and character codes of an entered character string. The transfer process 72 transfers the print data to the printer 3. The application 5 is also similar to that shown in FIG. 7.

Figure 11:
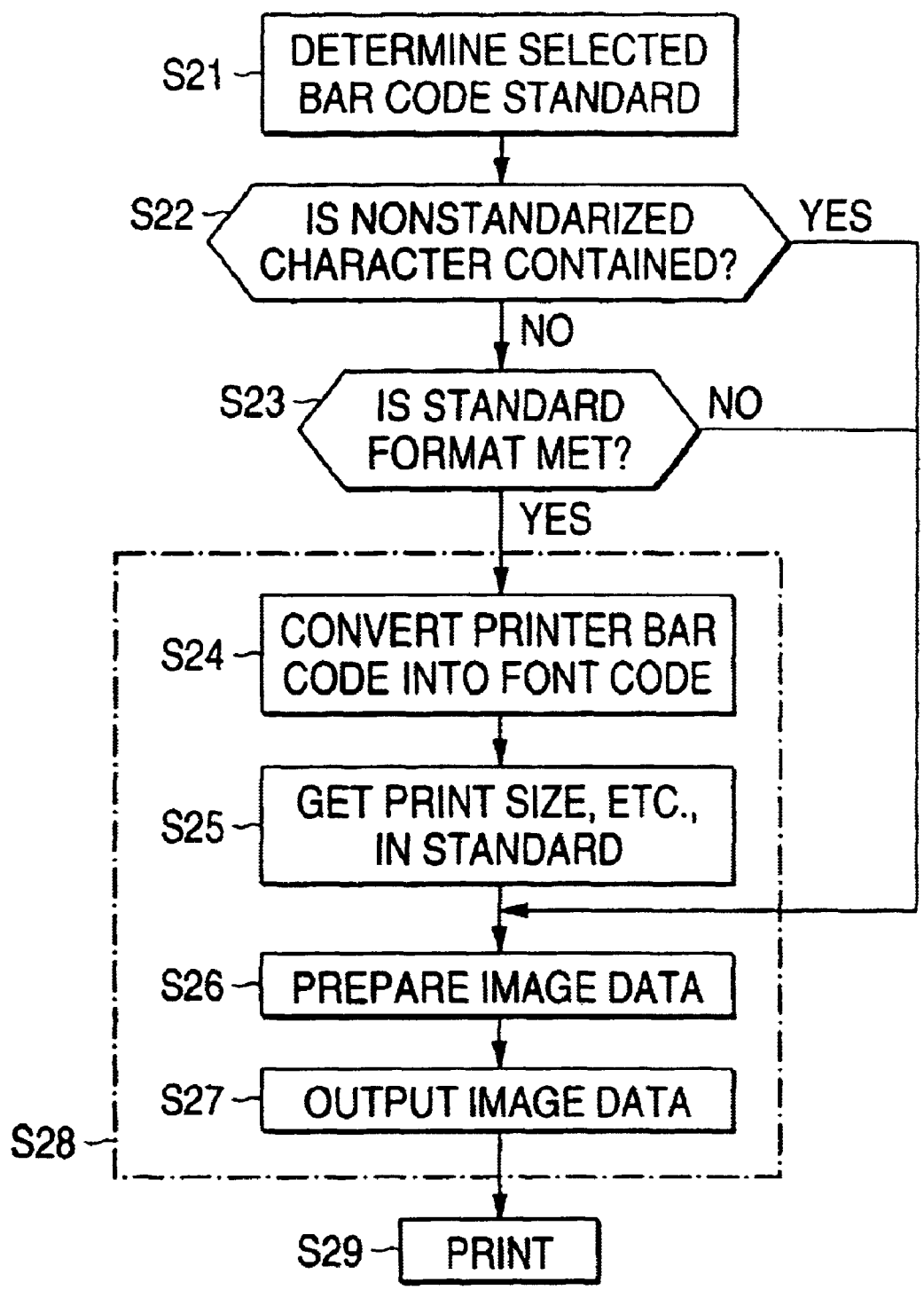
FIG. 11 is a flowchart to show processing of a printer in FIG. 10.
Figure 12:
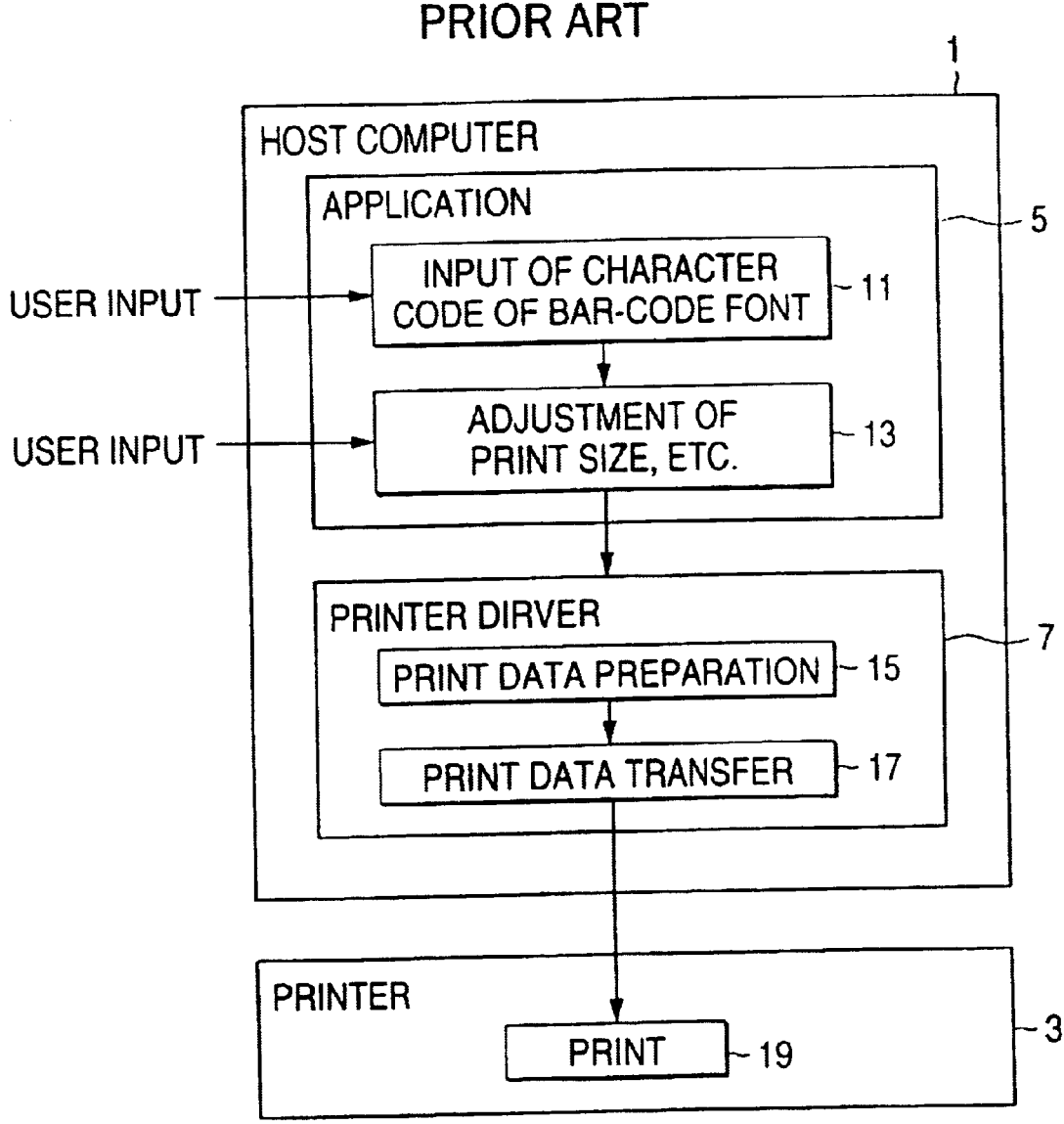
FIG. 12 is a block diagram to show an example of a conventional bar code printing system.

FIG. 11 shows a processing flow of the printer 3 receiving the print data.

The printer 3 first performs processing in the printer driver in the second embodiment described above. That is, based on the selected screen font contained in the supplied print data, the user-selected bar code standard corresponding to the font is determined at step S21 and the format information file 68 is referenced to check whether or not any nonstandardized character is contained at step S22 and check whether or not the entered character string meets the standard format at step S23. A process (S28) consisting of steps S24 to S27 is executed for referencing the conversion rule of the selected bar code standard in the conversion rule file 69, converting the character codes of the entered character string into a character code set indicating the bar code font contained in the printer, and outputting the character code set. The processing is identical with that previously described in the second embodiment and therefore will not be discussed again. In the printer 3, at step S26 for preparing print data, the bar code font data contained in the printer specified by the character code set generated at step S24 and the print spacing and print size information gotten at step S25 are used to prepare bar code image data that can be printed immediately in a printing mechanism. At step S27, the image data is transferred to the printing mechanism. At step S29, the image data is used to print the bar code. The correct bar code in the selected standard corresponding to the entered character string is thus printed out.

As we have discussed, also in the third embodiment, the user selects a desired bar code standard on the application 5 and enters a character string to be converted into a bar code, whereby the bar code pattern corresponding to the entered character string complying with the desired standard is printed accurately.

Although the invention has been described in its preferred embodiments with a certain degree of particularity, it can also be embodied in various forms other than the embodiments, needless to say. For example, all or some of the processes and files assigned to the printer driver or the printer in the embodiments can be realized by not only software, but also dedicated hardware.

Below a bar code, characters corresponding to the bar code (OCRB characters) can also be printed. A font of the OCRB characters can also be contained in the bar code font contained in the printer (namely, the bar code itself and the OCRB characters below the bar code are assumed to be one character as a piece and its font is designed). If such a font is used, when the long and wide dimensions and spacing of the bar code are adjusted in response to the bar code standard, the OCRB character size and spacing also change accordingly. Thus, the OCRB characters may be deformed unnaturally in the print result. On the other hand, an OCRB character font can also be provided apart from the bar code fonts in the printer. Since the size and spacing of the bar code and those of the OCRB characters can be adjusted separately and then can be combined to form the final image, the bar code and the OCRB characters can be printed in an ideally accurate pattern for every bar code standard.

As we have discussed, in the invention, the printer driver or the printer is provided with the function of converting a display font into a record font. Therefore, when record data prepared in a display font is supplied from the application program to the printer driver or the printer, the printer driver compatible with the printer or the printer itself can automatically convert the display font in the supplied record data into a record font different from the display font and output the record font. Therefore, a special font of bar codes, etc., that cannot be entered formerly unless character codes are entered can be entered easily from general-purpose application software such as a wordprocessor or a spreadsheet package; it can be printed extremely easily on recording paper, etc. Particularly, to enter a front of bar codes, historiated initials, etc., whose entry contents are hard to see if the actually printed font itself is viewed, a character font that can be understood by the user corresponding to a record font can be used as a display font; a recording device and a recording method capable of recording as the user desires without any entry error can be provided.

The functions of the recording device, the recording method, and the font files of the invention can be used versatilely on a wordprocessor program or any other general-purpose application software, so that the user can use his or her familiar application for special characters, etc., and further a similar system can be used to enter not only bar codes, but also various characters, graphics, etc.

What is claimed is:

1. A recording device that receives supplied record data, the supplied record data comprising a font file that includes a set of display font codes and a set of record font codes that differ from and correspond to the display font codes, the supplied record data further comprising an input character string converted into display font codes, the recording device comprising:

font converting means for converting the supplied record data, wherein the font converting means uses the font file to convert at least a part of the converted input character string from display font codes into record font codes;

means for outputting the record font codes corresponding to the input character string whose display font codes are converted by said font converting means;

a conversion rule storage section for storing (a) a plurality of conversion rules between the set of display font codes and the set of record font codes, and (b) format information when a record font code is recorded for each of the conversion rules, wherein a conversion rule selection section specifies the conversion rule for the supplied record data based on the font file; and a data conversion section for converting the supplied record data into record data containing record font codes based on the specified conversion rule and outputting the record data, said data conversion section reflecting the format information corresponding to the specified conversion rule on the record data and outputting the result, wherein said conversion rule storage section and said data conversion section are positioned in said means for outputting.

2. The recording device as claimed in claim 1, further comprising:

a data conversion section for converting a first code indicating the display font code into a second code indicating the record font code, and for outputting the second code or bit image data in the record font code indicated by the second code.

3. The recording device as claimed in claim 1, wherein the display font codes are character fonts and the record font codes are bar code fonts.

4. An information processing system comprising:

a recording device as claimed in claim 1; and a display section capable of displaying at least the input character string using the display font codes.

5. The information processing system as claimed in claim 4 wherein said recording device is installed as a printer driver.

6. A printing unit comprising:

a recording device as claimed in claim 1; and a printing mechanism capable of printing the record font codes.

7. A recording system comprising:

a recording device as claimed in claim 1;

a display section capable of displaying the display font codes; and a print section capable of printing the record font codes.

8. The recording system as claimed in claim 7, wherein said display section is capable of displaying the record font codes.

9. A recording method that converts supplied record data, the supplied record data comprising a font file that includes a set of display font codes and a set of record font codes that differ from and correspond to the display font codes, the supplied record data further comprising an input character string converted into display font codes, the recording method comprising:

converting the supplied record data, wherein the font file is used to convert at least a part of the converted input character string from display font codes into record font codes, said converting comprising, converting the supplied record data into record data containing record font codes based on a conversion rule between the set of display font codes and the set of record font codes and outputting the record data, wherein a plurality of conversion rules exist, selecting one of the conversion rules by specifying the conversion rule for the supplied record data based on the font file included with the supplied record data, converting the supplied record data into record data containing record font codes based on the specified conversion rule and outputting the record data, wherein format information when a record font code is recorded exists for each of the conversion rules, and reflecting the format information corresponding to the specified conversion rule on the record data and outputting the result; and outputting the record font codes corresponding to the input character string whose display font codes are converted.

10. The recording method as claimed in claim 9, wherein said conversion of supplied record data comprises converting a first code indicating the display font code into a second code indicating the record font code and outputting the second code or bit image data in the record font code indicated by the second code.

11. The recording method as claimed in claim 9, wherein the display font code are character fonts and the record font codes are bar code font codes.

12. The recording method as claimed in claim 9, further comprising:

displaying in the display font codes; and printing in the record font codes.

13. A recording medium for recording a program which comprises an instruction capable of executing a font conversion process, said font conversion process receiving supplied record data, the supplied record data comprising a font file that includes a set of display font codes and a set of record font codes that differ from and correspond to the display font codes, the supplied record data further comprising an input character string converted into display font codes, wherein said font conversion process:

converts at least a part of the converted input character string from display font codes into record font codes, said converting comprising, converting the supplied record data into record data containing record font codes based on a conversion rule between the set of display font codes and the set of record font codes and outputting the record data, wherein a plurality of conversion rules exist, selecting one of the conversion rules by specifying the conversion rule for the supplied record data based on the font file included with the supplied record data, converting the supplied record data into record data containing record font codes based on the specified conversion rule and outputting the record data, wherein format information when a record font code is recorded exists for each of the conversion rules, and reflecting the format information corresponding to the specified conversion rule on the record data and outputting the result and outputs the record font codes corresponding to the input character string whose display font codes are converted, wherein a conversion rule between the display font codes and the record font codes is recorded thereon, said program further comprising an instruction capable of executing a data conversion process that converts the supplied record data into record data containing the record font codes based on the conversion rule and outputting the record data.

14. The recording medium as claimed in claim 13, wherein said program further comprises an instruction capable of converting a first code indicating the display font code into a second code indicating the record font code and outputting the second code or bit image data in the record font code indicated by the second code.

15. The recording medium as claimed in claim 13, wherein said program further comprises an instruction capable of executing:

a display process of displaying in the display font code; and a print process of printing in the record font code.

16. The recording device as claimed in claim 1, further comprising a font receiving means for receiving said display font codes which are used in an application program at a host computer.

\* \* \* \* \*

UNITED STATES PATENT AND TRADEMARK OFFICE
CERTIFICATE OF CORRECTION

PATENT NO. : 6,633,292 B2
DATED : October 14, 2003
INVENTOR(S) : Masahiro Nakatsuji et al.

It is certified that error appears in the above-identified patent and that said Letters Patent is hereby corrected as shown below:

<u>Title page,</u>
Item [75], Inventor, should be corrected as follows:
-- Akira Suzuki --

Signed and Sealed this

First Day of June, 2004

JON W. DUDAS
*Acting Director of the United States Patent and Trademark Office*